UNITED STATES PATENT OFFICE.

WILLIAM LITTLE, OF HECKINGTON HALL, NEAR SANFORD, ENGLAND.

IMPROVEMENT IN SHEEP-WASHES.

Specification forming part of Letters Patent No. 192,587, dated July 3, 1877; application filed February 16, 1877.

*To all whom it may concern:*

Be it known that I, WILLIAM LITTLE, of Heckington Hall, near Sleaford, in the county of Lincoln, England, have invented new and useful improvements in the manufacture of cleansing and disinfecting fluids for washing sheep and for other purposes, which improvements are fully set forth in the following specification.

This invention has for its object improvements in the manufacture of cleansing and disinfecting fluids for washing sheep and for other purposes.

First, I take gas-tar and subject this tar to one or more careful distillations, dividing the products of each distillation into three parts—viz., those that have a specific gravity lighter than water, those that have a specific gravity heavier than water, and those that distill at a high temperature, and are known as "green" or "anthracene" oil. The products lighter than water I distill again, by which I get an additional portion of the oil heavier than water. The light oil I set aside. The green or anthracene oil, after the extraction of the anthracene by the usual process, I return to the intermediate oil, and, if thought desirable, I subject the whole to a further purification by another distillation.

Second, I take ordinary resin, which I subject to distillation, and the product to another distillation, if desirable, for the purpose of purification.

Third, I take animal or vegetable oil of the purest kind. I boil this oil with a solution of caustic potash, in the usual way, until I obtain a perfect form of oleate of potash. The oleate of potash should be transparent and consist of one hundred parts—of about forty-three oil, ten potash, and forty-seven water.

Fourth, I make a solution of caustic soda in water, containing ten per cent. of pure soda.

Fifth, I then mix one thousand pounds of the hydrocarbon oil with five hundred pounds of the purified resin-oil, and let the combined oils stand for twenty-four hours.

Sixth, I then put one hundred pounds of the oleate of potash into a boiler, and mix it by a gentle heat with one hundred pounds of the mixed resin and hydrocarbon oils, and, when combined, I add it to the rest of the mixed oils and stir well together. After standing twenty-four hours I add nine gallons of the solution of soda and stir well together.

When cold, and when required for use at certain seasons, to prevent the attack of the maggot or blue-fly, I mix well with the rest ten pounds, by weight, of bisulphide of carbon.

I claim—

The combination of the distilled products from gas-tar, heavier than water, resin-oil, oleate of potash, and solution of soda, substantially in the manner and about in the proportions specified, to make a liquid chemical combination, (and not a mixture in which the compound parts are held in suspension,) mixable in any proportion with water.

WILLIAM LITTLE.

Witnesses:
   ELIZABETH LITTLE,
       *Heckington, Lincolnshire.*
   HENRY GODSON,
       *Heckington.*